Dec. 12, 1950 D. H. GRIDLEY 2,533,242

DATA TRANSFORMATION SYSTEM

Filed Dec. 27, 1949 3 Sheets-Sheet 1

Inventor
DARRIN H. GRIDLEY

By [signature]

ATTORNEY

Inventor
DARRIN H. GRIDLEY

By [signature]

ATTORNEY

Dec. 12, 1950　　D. H. GRIDLEY　　2,533,242

DATA TRANSFORMATION SYSTEM

Filed Dec. 27, 1949　　3 Sheets-Sheet 3

INVENTOR
DARRIN H. GRIDLEY

BY M. O. Hayes

ATTORNEY

Patented Dec. 12, 1950

2,533,242

UNITED STATES PATENT OFFICE 2,533,242

DATA TRANSFORMATION SYSTEM

Darrin H. Gridley, Washington, D. C.

Application December 27, 1949, Serial No. 135,213

6 Claims. (Cl. 177—337)

(Granted under the act of March 3, 1883, as amended April 30, 1928; 370 O. G. 757)

This invention relates to data transformation systems in general and in particular to an electrical transformation system for converting information contained as combinations of binary digital conditions into an instantaneous quantity in a single line.

In many calculating operations, information regarding a single variable quantity is contained as variations in the individual values of each of a plurality of digits. Information thus available is not readily usable as an absolute magnitude of the variable quantity. As an example in a decimal system where the absolute value of a quantity might be 25, information contained as separate quantities 2 and 5 regarding the tens and units decimal digits is not readily available as a single quantity 25 in a single line. Information in the form of a plurality of binary digits is frequently available from electrical counter circuits, such as a multi-stage cascade connected group of Eccles-Jordan circuits. The tremendous advantages of calculating operations with binary digits in these electrical counter circuits makes it desirable to obtain rapid conversion of a quantity from a digital representation thereof into an absolute magnitude representation.

It is accordingly an object of the present invention to provide a data transformation system which will convert information from a digital form into an absolute magnitude quantity.

Another object of the present invention is to provide a data transformation system which will combine information contained as variations in the states of a plurality of electrical counter stages into the form of variations of a single signal.

Other and further objects and advantages of the present invention will become apparent upon a careful consideration of the following detailed description when taken in conjunction with the accompanying drawings in which:

Fig. 5 shows a schematic diagram of a typical cathode ray tube deflection amplifier.

In accordance with the fundamental principles of the present invention a data transformation system is provided for converting information in the form of variations in a plurality of component quantities into variations in a single quantity. Input signals to the system are supplied typically as variations of a plurality of electrical binary quantities and output signals are delivered as a single electrical signal. To achieve this transformation, a code resolution member is employed, preferably a disc, having radial portions thereof calibrated in all the possible binary combinations of values of the component quantities encountered and having the value of output quantity corresponding to each input combination contained as variations in the displacement of an output calibration line from the center of the code resolution member. In operation the code resolution member is revolved at high speed in proximity to signal pick up devices. Signals in dependency on the various radial calibrations of binary values may thus be derived by the signal pick up devices and delivered in rapid order. Each time correspondence occurs between a combination of component quantities in the radial calibration of the disc and actual input component quantities, a sampling pulse signal is produced. Upon occurrence of the sampling pulse signal, a single output signal is provided dependent upon the value of the output calibration in register with the signal pick up device therefor.

Figures 1, 2:
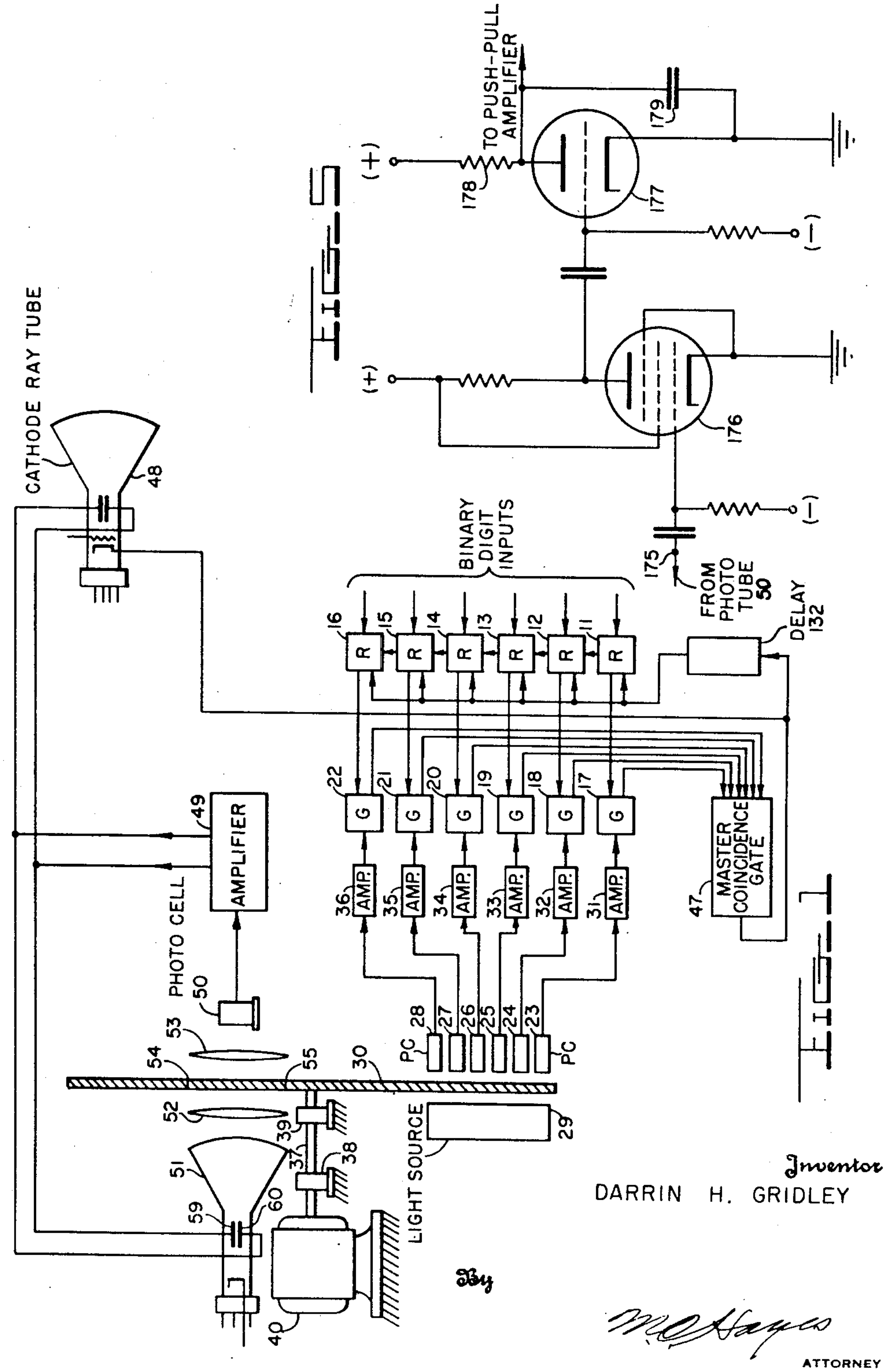
Fig. 1 shows, partly in block form, a schematic diagram of the apparatus of the present invention.
Fig. 2 shows a typical code resolution member as employed in the apparatus of Fig. 1.

With particular reference now to Fig. 1 of the drawings, an apparatus illustrative of the features of the invention as applied to a binary digital coding is shown partly in block form. The particular features of binary digital operation with just two values for each binary digit rather than ten as in the more familiar decimal digit system makes such a binary system highly desirable in many pulse operative devices. The input signals to be transformed having binary characteristics such as plus-minus, off-on, etc. are supplied to the apparatus at the separate inputs to register devices 11, 12, 13, 14, 15 and 16. Each of these register devices 11 through 16 may typically be a suitable form of trigger circuit or other holding circuit intended to receive short duration input pulses periodically and remain for a prescribed period of time in one or the other of two conductivity conditions indicative of the value of a particular binary digit represented by the input pulses. The input signals supplied to the register devices may be simultaneous, all registry devices receiving signals at the same time, or may be sequential, wherein the registry devices receive input signals in rapid ordered sequence. The exact form of input is of no particular significance, the primary requisite being that by virtue of the register devices the signals regarding the value of each binary digit may be made co-existent if not already so and are lengthened or "held" to where they exist for a considerable period of time.

The thus lengthened and simultaneously existing signals of binary form are supplied as first gating signals to a series of gating circuits 17, 18, 19, 20, 21 and 22. Each gating circuit is also supplied with second gating signals from a code wheel 30 and is designed to provide output signals whenever all the first and second gating signals are in correspondence. The gating circuits are subsequently discussed at length in connection with Fig. 3.

The gating circuits 17 through 22 receive their second gating signal input from a series of photoelectric cells 23, 24, 25, 26, 27 and 28 which are responsive to light delivered from a continuously operative light source 29 through clear and opaque coded portions carried by the code disc 30. Interposed between each of the gating circuits 17 through 22 and the corresponding photoelectric cells 23 through 28 is a suitable amplifier of the group numbered 31, 32, 33, 34, 35 and 36 which is designed to bring the level of the output signal from the corresponding photoelectric cell to an amplitude suitable for operation of the gating circuits 17 through 22.

The code disc 30 is mounted on a shaft 37 which in turn is journalled by suitable bearings 38 and 39 and provided with rotation at a high speed, typically 7200 R. P. M., either directly or through a speed transformation device by motor 40. A typical pattern for the code disc 30 shown in diametrical cross section in Fig. 1 is given in a face view in Fig. 2 to which reference is now made. The code disc shown therein contains six outer coded clear and opaque rings or tracks one for each input quantity numbered 41, 42, 43, 44, 45 and 46 which are placed in such location that they are in registry with the photoelectric cells 23, 24, 25, 26, 27 and 28 in order, that is, light from source 29 transmitted through the clear portions of track 41 energizes the photoelectric cell 23, light through the clear portion of track 42 energizes photoelectric cell 24 and so on. In this structure a clear patch is representative of one binary value and the opaque patch representative of the other binary value. The coded combinations present on these six signal tracks of code disc 30 are representative of at least all of the possible combinations of input signal values which can be delivered to the input register devices 11, 12, 13, 14, 15 and 16. Since in this illustration a total of six different inputs are used, a total of sixty-four different binary combinations may exist. For purposes of simplicity in drawing code disc 30, however, the total number of code combinations has been set at 60, althought it is apparent that six binary digits (tracks) are capable of registering a total of sixty-four possible combinations. As will be noted from Fig. 2, the clear and opaque portions of code tracks 41 to 46 are arranged so that along any given radius of the code disc 30 the clear and opaque portions of adjacent tracks form all of the possible code combinations of the input signals. With this arrangement it may therefore be readily appreciated that with each revolution of code disc 30, one combination of clear and opaque portions of the six tracks 41, 42, 43, 44, 45 and 46 is obtained which will correspond to the combination contained in the register devices 11 through 16. When this condition is obtained, all of the gating circuits 17 through 22 are brought to a similar conductivity condition which is sensed by the master coincidence gating circuit 47 to produce a short duration output signal. This output signal is supplied to two points in the overall circuit. A first point of application is through a delay device 132 to the register devices 11 through 16 to bring about the reset thereof to the initial or reference condition. Additionally the output signals from the master coincidence gating circuit 47 are delivered to a cathode ray tube 48 to produce an intensification of the electron beam thereof.

Figure 2:
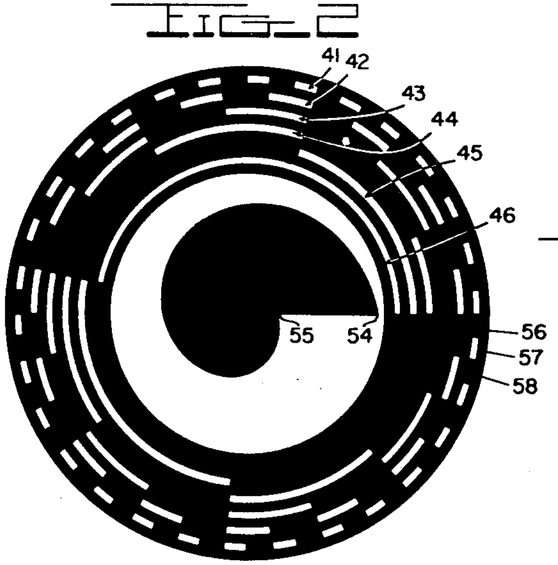
Figure 2A:
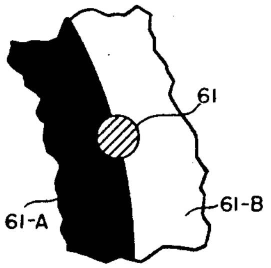
Fig. 2A shows a detail of scanning of the calibration signal on the member of Fig. 2.

Deflection of the electron beam of the cathode ray tube 48 is provided by the connection thereof to an amplifier 49. Amplifier 49 operates on the output from the photoelectric cell 50 which obtains excitation by light delivered through code disc 30 from a light source which includes a second cathode ray tube 51. Cathode ray tube 51 is adjusted to provide a high intensity spot of light on the face thereof which is focused by the lenses 52 and 53 in its passage to photoelectric cell 50. The region of code disc 30 through which light must pass from cathode ray tube 51 to photoelectric cell 50 is indicated on Figs. 1 and 2 by that radius within the numerals 54 and 55. This space as shown in Fig. 2 contains a linear spiral output calibration variation from a small radius at point 55 to a large radius at point 54 although any other form of variation might be employed, for example, the spiral is not necessarily of a linear nature. In a typical example selected, this spiral is linear, beginning from a minimum radius at the lowest binary input combination, progressing linearly outward with additional binary quantities and reaching a maximum radius from the center at the maximum value of the binary input. Cathode ray tube 51 is provided with signal responsive deflection in one plane only, that is, a plane which is a radius of the code disc 30. As viewed in Fig. 2 this would be represented by the typical lines 56, 57 and 58. The light transmitted through the clear portion of this spiral area actuates photoelectric cell 50 and operates the amplifier 49 to apply a deflecting potential between the electrodes 59 and 60 of tube 51 of such a nature as to deflect the electron beam formed on the face of tube 51 toward the center of the code disc 30. Conversely when light is stopped by the opaque portion of code disc 30 in the area between lines 54 and 55 the lack of excitation of the photoelectric cell 50 operates through the amplifier 49 and deflection plates 59 and 60 to drive the electron beam spot on the face of tube 51 in a direction away from the center of code disc 30. Time constant circuits are included in amplifier 49 to prevent hunting so that the electron beam spot on the face of tube 51 will normally be in such position where at any instant it is half on the clear and half on the opaque portion of the spiral of code disc 30. This is shown in Fig. 2A where the area covered by the spot on the face of tube 51 is indicated by the shaded portion 61 half of which is over the opaque area 61—A and half over the clear area 61—B.

Figure 3:
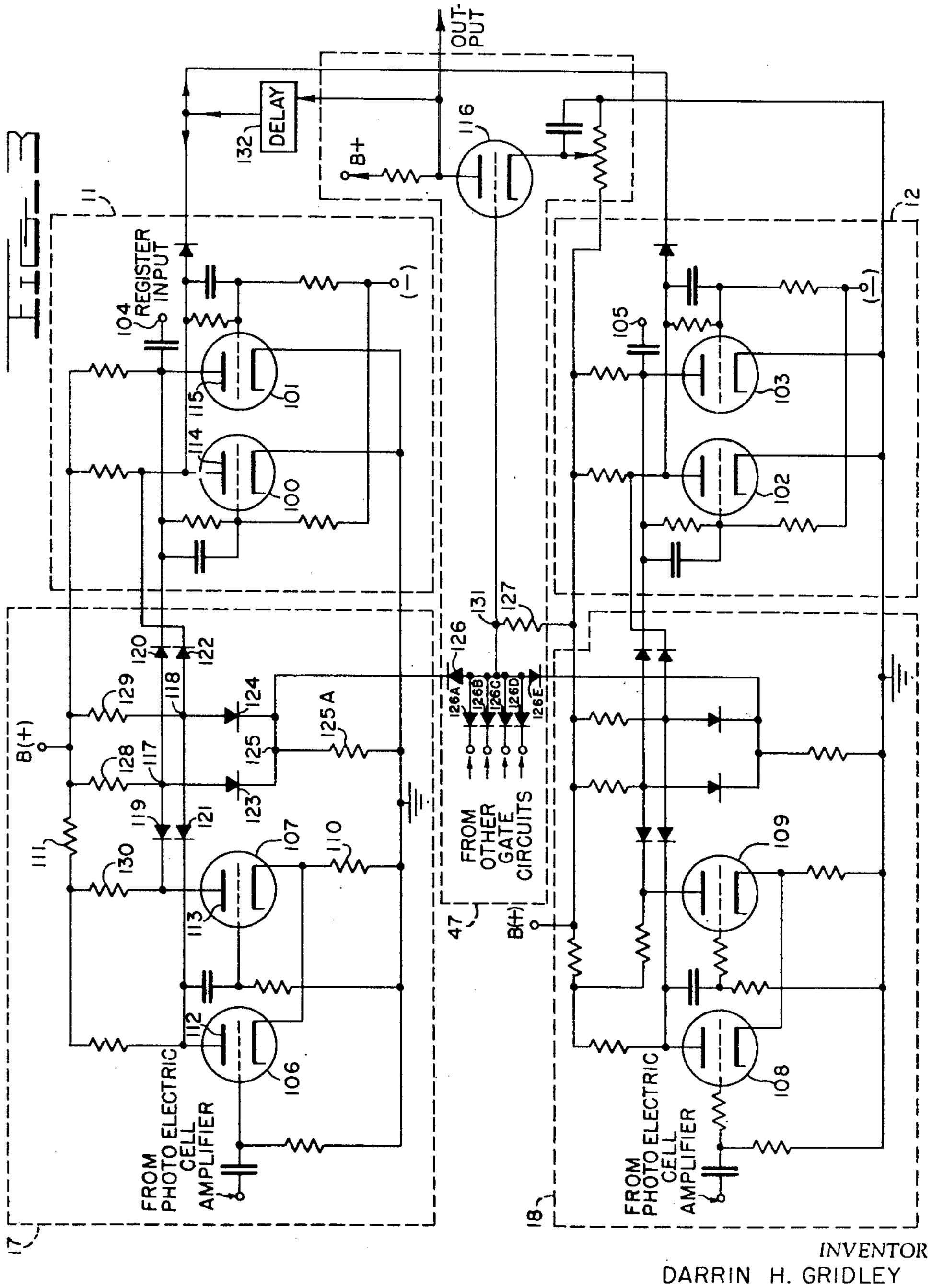
Fig. 3 shows a schematic diagram of certain of the blocked-in components of Fig. 1.

Details of the register devices 11—16, gating circuits 17—22 and the master coincidence gate 47 are typified in Fig. 3. For simplicity only two of the register devices and gating circuits are shown rather than the full six of each.

Each register device 11 through 16 consists primarily of a dual stability two tube trigger circuit of the type generally called Eccles-Jordan. The typical register devices 11 and 12 have the tubes 100—101 and 102—103 respectively. A reference stability condition for the register devices as typified by those of Fig. 3 may be taken with tubes 100 and 102 conductive. Binary input signals are applied to terminals 104 and 105 and by the presence or absence of input signals of selected polarity at these terminals, in various combinations, the register devices will individually either change from their reference condition or remain therein. Thus, for example, if terminal 104 receives a negative input pulse and terminal 105 a positive input pulse or no input pulse at all, tube 100 will be cut-off and tube 101 brought to conduction while tubes 102 and 103 will not be affected.

Each of the gating circuits 17—22 includes a two-stage cascade connected limiter-amplifier circuit such as the tubes 106—107 and 108—109 which correspond to gate circuits 17 and 18 respectively. The amplifiers are designed to be overdriven, that is, driven from a condition of anode current cut-off to a condition of heavy conduction, in a push-pull manner, responsive to the signals from the photo-electric cell amplifiers 31—36. Thus, for example, tube 106 will be cut-off with its anode up in potential while tube 107 is conductive with its anode down in potential, and vice versa. The limiter-amplifier circuits are arranged, for example, by selection of biasing resistor 110 and supply resistor 111 so that the potential extremes experienced at the anodes 112 and 113 are the same as those at the anodes 114 and 115 of the corresponding register device. For most satisfaction it is desirable that the potential extremes for all register devices and limiter-amplifiers of the overall circuit be the same.

The anodes of all of the register tubes and limiter-amplifier tubes in the apparatus are inter-connected through a network of unilateral impedance elements and voltage dropping resistors. Also connected to this network is the master coincidence gate circuit 47 whose primary element is an electron tube 116.

The primary purpose of the whole apparatus of this figure is to produce an output signal from tube 116 each time the combination on the code disc 30 corresponds to the combination of input signals (binary digits) delivered to or held by the register devices. Each binary digit as stored in a register device is individually compared with binary digits on the code disc and if correspondence between all is obtained, an output signal is delivered. Since correspondence may occur in either of the two binary conditions, dual comparison circuits are required.

A first comparison point for the register device of tubes 100, 101 is point 117 which is connected to anodes 113 and 115 through unilateral impedance elements 119, 120. A second comparison point 118 is connected to anodes 112 and 114 through unilateral impedance elements 121, 122. Points 117 and 118 are connected through unilateral impedance elements 123 and 124 to point 125. Point 125 is connected to ground through resistance 125—A and also through unilateral impedance element 126 and resistance 127 of the master coincidence gate to B+ potential. Thus current normally flows through resistance 127, element 126, and resistance 125—A to ground. Normally resistance 127 also supplies current to impedance elements 126—A, 126—B, 126—C, 126—D and 126—E which supply similar points 125 in the other gating circuits 18—22, thereby placing point 131 considerably below B+ potential holding tube 116 cut-off. Preferably, the unilateral impedance element 119 is polarized to permit current flow from point 117 to anode 113 when anode 113 is at a lower potential than point 117. The points 117, 118 are set in potential by a connection through resistances 128, 129 to B+. Thus when one of the anodes 113, for example, connected a point 117 is conductive and consequently at a low potential by virtue of the potential drop across its load resistance 130, the unilateral impedance element 119 will become conductive to lower the potential at point 117. By virtue of these connections, both points 117 and 118 will be at approximately the same medium potential which is below that of point 125 whenever conduction is by either of the combinations 106—101 or 107—100. These points 117 and 118 will be at different potentials, 117 high and 118 very low, for the conduction combination 106—100, and 117 very low and 118 high for the conduction combination 107—101.

The high potential of these points 117 and 118 is higher than the potential normally maintained at point 125 by conduction through element 126, thus when either point 117 or 118 is high, conduction through element 126 is stopped raising the potential at point 131 slightly. This rise in potential is insufficient to bring tube 116 to conduction, however when conduction through all of elements 126—126—E is terminated at the same time by a condition of correspondence in all of the paired circuits, point 131 rises sufficiently to unblock tube 116 and permit conduction by tube 116, resulting in the production of a negative output pulse at the anode thereof. The negative output pulse thus produced is also delivered to the register devices as typified by the connection through a short time delay device 132 to the tubes 101 and 103 to reaffirm the reference condition in the register devices wherein the tubes 100 and 102 are conductive ready for subsequent operation on additional input signals. With the direct connections as shown it is desirable that the tube 116 be provided with a higher B+ potential than the other tubes of Fig. 3.

Figure 4:
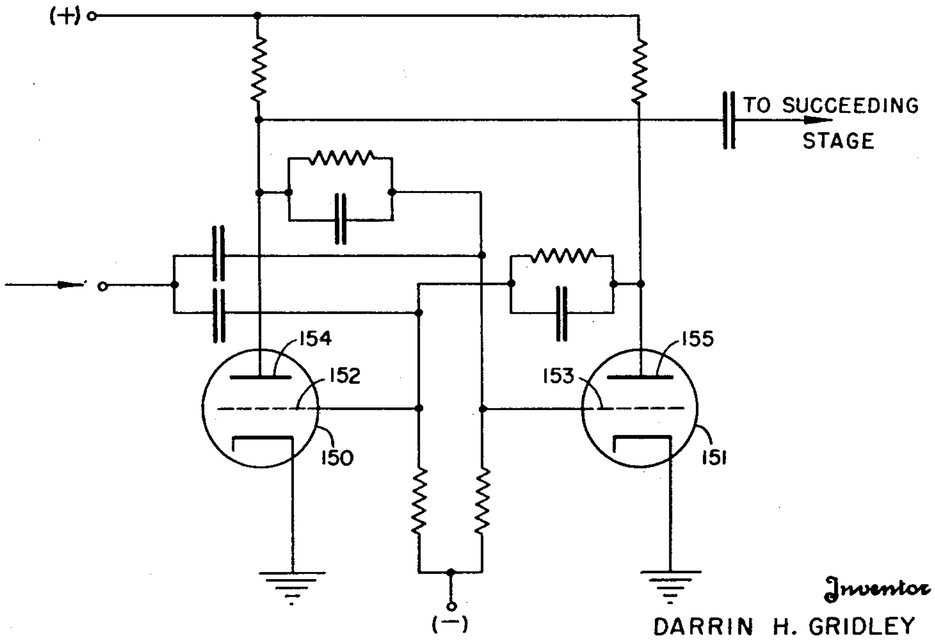
Fig. 4 is a schematic diagram of a stage of a typical multi-stage cascade connected counter circuit as could be employed in conjunction with the apparatus of the present invention.

It should be understood that, while the register devices have been described primarily as independent signal holding devices, receptive to separate input signals, other forms of connection could be employed. As an example, the registers may be component sections of a cascade connected counter circuit with sequential pulse input to the first section of the cascade, typically register 11. A typical single stage of such a cascade connected counter circuit is shown in Fig. 4. It is easily recognized as of the basic Eccles-Jordan type wherein two different stable conductivity conditions are possible, with either tube 150 or 151 conductive. Input negative pulses at one frequency are applied in parallel to the grids 152—153 and each produces cut-off of the then-conductive tube. Output signals at half the input frequency are thus obtainable at either anode, typically anode 154 and are applied to a succeeding similar stage as input signals thereto. Connections to the appropriate gating circuit (17—22 Fig. 1) are made to both anodes 154 and 155 just as previously described for the holding type register devices.

Circuit details of a part of a cathode ray tube defection amplifier 49 are shown in Fig. 5. Input signals are supplied to terminal 175 from photo-electric cell 50 of Fig. 1. Signals from photoelectric cell 50 are first amplified by a high gain amplifier stage of tube 176 and then applied to a triode type driver tube 177. The polarity of signals as applied to the grid of tube 176 is such that upon an increase in the intensity of light delivered to photoelectric cell 50, conductivity in tube 176 will decrease and upon a decrease in the light intensity, conductivity of tube 176 will increase.

To the anode of tube 177 is connected a loading resistance 178. The output signal derived at the anode of tube 178 is preferably applied to a push-pull type of deflection amplifier which may be included in the amplifier block 49 of Fig. 1 but not shown in Fig. 5 schematic, however the deflection signal may be applied to the tubes 48 and 51 direct from tube 177 in an unbalanced manner if so desired. The overall polarity of connections to tube 51 is such that an increase in the intensity of light delivered to photoelectric cell 50 will tend to drive the point of impact of the electron beam of tube 51 along a radius of code disc 30 and toward the center of the code disc while a decrease in light intensity will drive the beam impact point away from the center of code disc 30. To minimize hunting tendencies in the system, capacitance 179 is placed between the anode of tube 177 and ground.

With this connection it is readily appreciated that the electron beam of the cathode ray tubes 51 and 48 will move in and out following the radius of the linear spiral calibration line on code disc 30 as the code disc 30 is rotated.

The output from the system is derived by visual representation on the calibrated face of cathode ray tube 48. Deflection potentials as applied to this tube are the same as those for the calibration curve following tube 51, however intensification of the beam in tube 48 takes place only at the instant in time of occurrence of complete coincidence between the code on the six tracks of code disc 30 and the signal "held" by the register devices 11—16, as determined by the gating circuits 17—22 and the master coincidence 47. Since this intensification must occur once each revolution of code disc 30 or 7200 times per minute, the individual flashes will not be perceptible as such but as a substantially continuous spot of light on the face of tube 48. The spot will move back and forth across the face of tube 48 in accordance with changes in the value of the binary signals applied to the register devices 11—16. Accurate calibration of the face of tube 48 will thus provide easily read indications.

From the foregoing it is apparent that the embodiment shown of the present invention is intended to be illustrative only and that modifications of course can be made without exceeding the scope of the present invention as defined in the appended claims.

The invention described herein may be manufactured and used by or for the Government of the United States of America for governmental purposes without the payment of any royalties thereon or therefor.

What is claimed is:

1. A data transformation system comprising a circular code member having digital coded combinations arranged in rings thereon and a plot of input-output relationship as the separation between distinctively identified sections thereof, means rotating the code member, means deriving primary control signals in dependency on the digital coded combinations on the code member in registry therewith, coincidence means producing a secondary control signal when primary control signals correspond to input coded signals, and means deriving output signals proportional to the value of the input-output relationship plot corresponding to the position of the code member providing secondary control signals.

2. A data transformation system comprising, a circular code member having binary signal combinations arranged in rings thereon and a plot of input-output relationship as a separation between distinctive sections thereof, means rotating the code member, photoelectric means deriving primary control signals from the binary signal combinations on the code member, comparison means producing secondary control signals when primary control signals are equivalent to applied input signals, a beam of energy, means deflecting the beam of energy positioning it on the plot of input-output relationship, and means providing output indication proportional to beam deflection at the instant of production of secondary control signals.

3. A data transformation system comprising, a code member having binary signal combinations arranged in light blocking and transmissive portions of signal paths thereon and a plot of input-output relationship as a separation between distinctive sections thereof, means rotating the code member, photoelectric means deriving primary control signals from the binary signal combinations on the code member, an input signal source providing input signals as binary digits in number equal to the number of binary digits on the code member, comparison means producing secondary control signals when primary control signals are equivalent to input signals, a beam of light, means deflecting the beam of light positioning it on the plot of input-output relationship, and means providing output signals proportional to beam deflection at the instant of production of secondary control signals.

4. A data transformation system comprising, a circular code member having binary digit combinations arranged it light blocking and transmissive portions of rings thereon and a plot of input-output relationship as a separation between distinctive sections thereof, means rotating the code member, first photoelectric means delivering primary control signals from the binary signal combinations on the code member, an input signal source providing input signals as binary digits in number equal to the number of binary digits on the code member, comparison means producing secondary control signals when primary control signals are equivalent to input signals, a cathode ray tube, lens means imaging illumination from the cathode ray tube on the code member in the region of the plot of input-output relationship thereon, beam deflection means for said tube providing positioning of the point of impact on the tube screen to cover the range of variation of the plot of input-output relationship on the code member, secondary photoelectric means responsive to light from the cathode ray tube controlled by the code member in the input-output relationship region thereof, amplifier means connected to the output of the secondary photoelectric means and to the deflection means of the cathode ray tube providing deflection signals for the cathode ray tube holding the beam thereof at the separation between the distinctive sections of the plot of input-output relationship, and signal indicating means connected to the amplifier means providing indication of the cathode ray tube deflecting signal.

5. A data transformation system comprising, a circular code member having binary signal combinations arranged in light blocking and transmissive portions of signal rings thereon and a plot of input-output relationship as a separation between distinctive sections thereof, means rotating the code member, photoelectric means deriving primary control signals from the binary signal combinations on the code member, an input signal source providing input signals as binary digits in number equal to the number of binary digits on the code member, comparison means producing secondary control signals when primary control signals are equivalent to input signals, a beam of light, means deflecting the beam of light positioning it on the plot of input-output relationship, and means providing output signals proportional to beam deflection at the instant of production of secondary control signals.

6. Apparatus for converting an unknown electrical binary quantity into an electrical quantity having absolute magnitude comprising means producing in rapid order sequence all the possible binary signal combinations which the unknown binary quantity may assume, said means including apparatus for producing an absolute magnitude output signal varying in magnitude in direct relation to the binary signals, coincidence means receiving both the unknown binary signal and the rapid order sequence of binary signal combinations producing a pulse when the two binary signals correspond, and indicator means responsive to said pulse to deliver the value of the absolute magnitude ouput signal at this instant.

DARRIN H. GRIDLEY.

No references cited.